United States Patent
Lynam et al.

(10) Patent No.: US 10,170,901 B2
(45) Date of Patent: Jan. 1, 2019

(54) STACKED BUS ASSEMBLY WITH STEPPED PROFILE

(71) Applicant: Eaton Corporation, Cleveland, OH (US)

(72) Inventors: Larry Van Lynam, Youngsville, NC (US); James Hartsfield Hardy, Raleigh, NC (US)

(73) Assignee: Eaton Intelligent Power Limited (IE)

( * ) Notice: Subject to any disclaimer, the term of this patent is extended or adjusted under 35 U.S.C. 154(b) by 0 days.

(21) Appl. No.: 15/451,997

(22) Filed: Mar. 7, 2017

(65) Prior Publication Data

US 2018/0261990 A1 Sep. 13, 2018

(51) Int. Cl.
| | | |
|---|---|---|
| *H02G 5/06* | (2006.01) | |
| *H02B 1/20* | (2006.01) | |
| *H01B 5/02* | (2006.01) | |
| *H02B 1/30* | (2006.01) | |
| *H02B 1/04* | (2006.01) | |

(52) U.S. Cl.
CPC .............. *H02G 5/06* (2013.01); *H01B 5/02* (2013.01); *H02B 1/04* (2013.01); *H02B 1/20* (2013.01); *H02B 1/30* (2013.01)

(58) Field of Classification Search
CPC . H05K 2201/10272; H05K 2201/1053; H05K 2201/10492; H05K 2201/10545; H02G 5/005; H02G 5/06; H02G 5/10; H02G 5/025; H02G 5/00; H02G 5/007; H02G 5/08; H02G 5/002; H02B 1/20; H02B 1/056; H02B 1/21; H02B 5/06; H02B 1/22; H02B 13/005; H02B 1/32; H02B 11/04; H02B 1/04; H02B 1/30; H02B 5/02; H01B 1/22; H01B 1/16
See application file for complete search history.

(56) References Cited

U.S. PATENT DOCUMENTS

| | | | |
|---|---|---|---|
| 3,202,880 A | | 8/1965 | Stanback |
| 3,346,777 A | | 10/1967 | Leonard et al. |
| 3,354,357 A | * | 11/1967 | Stanback ............. H01R 9/2458 174/99 B |
| 3,376,377 A | * | 4/1968 | Fehr, Jr. ................. H02G 5/007 174/72 B |
| 3,384,856 A | * | 5/1968 | Fisher ..................... H02G 5/06 174/68.2 |
| 3,619,727 A | | 11/1971 | Hackenbroch |
| 3,721,864 A | | 3/1973 | Rozenboom |
| 3,842,322 A | | 10/1974 | Leonard |
| 5,166,861 A | | 11/1992 | Krom |
| 6,781,818 B2 | * | 8/2004 | Josten ..................... H02B 1/21 174/149 B |
| 2005/0162817 A1 | * | 7/2005 | Miller ..................... H02B 1/21 361/611 |

(Continued)

*Primary Examiner* — Adam B Dravininkas
(74) *Attorney, Agent, or Firm* — Ward and Smith, P.A.

(57) ABSTRACT

A bus bar assembly for a power distribution unit or other piece of electrical equipment includes a stack of bus bars configured to be attached to a surface and insulated from one another. The bus bars have aligned longitudinal centerlines and respective widths that decrease along a direction perpendicular to the surface to provide a stepped profile in cross-section. In some embodiments, the bus bars may have substantially the same cross-sectional area.

18 Claims, 5 Drawing Sheets

(56) References Cited

U.S. PATENT DOCUMENTS

| | | | |
|---|---|---|---|
| 2006/0120026 A1* | 6/2006 | Wiant | H02B 1/21 |
| | | | 361/614 |
| 2006/0121796 A1* | 6/2006 | Josten | H02B 1/20 |
| | | | 439/715 |
| 2011/0149483 A1* | 6/2011 | Diaz | H02B 1/056 |
| | | | 361/637 |
| 2016/0233649 A1* | 8/2016 | Baillargeon | H01R 25/162 |
| 2016/0315453 A1* | 10/2016 | Taylor | H02B 1/052 |

* cited by examiner

STACKED BUS ASSEMBLY WITH STEPPED PROFILE

BACKGROUND

The inventive subject matter relates to electrical apparatus and, more particularly, to electrical apparatus including bus bars for connection of electrical devices such as circuit breakers.

Electrical equipment, such as power distribution units (PDUs) and breaker panels, often include bus bars that are used to provide connections to devices such as circuit breakers, contactors, power converters and the like. For example, a typical three-phase PDU may include three bus bars that are attached to a rear wall of the PDU cabinet or panel. In some conventional panel boards, such bus bars may be commonly arranged in a vertical manner and spaced apart along a horizontal direction, and circuit breakers may be connected to the bus bars using wires or other connecting structures. Various other bus bar arrangements for electrical panel boards are described, for example, in: U.S. Pat. No. 3,202,880; U.S. Pat. No. 3,346,777; U.S. Pat. No. 3,354,357; U.S. Pat. No. 3,619,727; U.S. Pat. No. 3,721,864; U.S. Pat. No. 3,842,322; and U.S. Pat. No. 5,166,861.

SUMMARY

Some embodiments of the inventive subject matter provide a bus bar assembly including a stack of bus bars configured to be attached to a surface and insulated from one another. The bus bars have aligned longitudinal centerlines and respective widths that decrease along a direction perpendicular to the surface, such that the bus bars may form a stepped profile in cross-section. In some embodiments, the bus bars of the stack of bus bars may have substantially the same cross-sectional area, e.g., wider ones of the bus bars may be thinner than narrower ones of the bus bars.

In some embodiments, the stack of bus bars may include a first bus bar having a first width, a second bus bar overlying the first bus bar and having a second width less than the first width, and a third bus bar overlying the second bus bar and having a third width less than the second width. The first, second and third bus bars may have conductor attachment portions proximate edges thereof. Conductor connection means, such as bolt holes, may be provided at the conductor attachment portions. The second bus bar may be thicker than the first bus bar and the third bus bar may be thicker than the second bus bar. The bus bars may be separated from one another by spaced apart insulating standoffs.

Further embodiments provide an apparatus including an enclosure and a stack of bus bars attached to a surface of the enclosure and electrically insulated from one another, wherein the bus bars have aligned longitudinal centerlines and decreasing widths along a direction perpendicular to the surface of the enclosure and are configured to be electrically connected to one or more electrical devices disposed in the enclosure via conductor members attached to conductor attachment portions proximate edges of the bus bars.

Still further embodiments provide a power distribution unit including an enclosure, a stack of bus bars mounted on a surface within the enclosure and separated from one another by spaced apart insulating standoff members. The bus bars have aligned longitudinal centerlines and have respective widths that decrease along a direction perpendicular to the surface of the enclosure. The power distribution unit further includes at least one circuit breaker mounted in the enclosure and electrically connected to the bus bars by conductor members that are attached to conductor attachment portions of the bus bars proximate edges of the bus bars.

DETAILED DESCRIPTION

Figure 1:
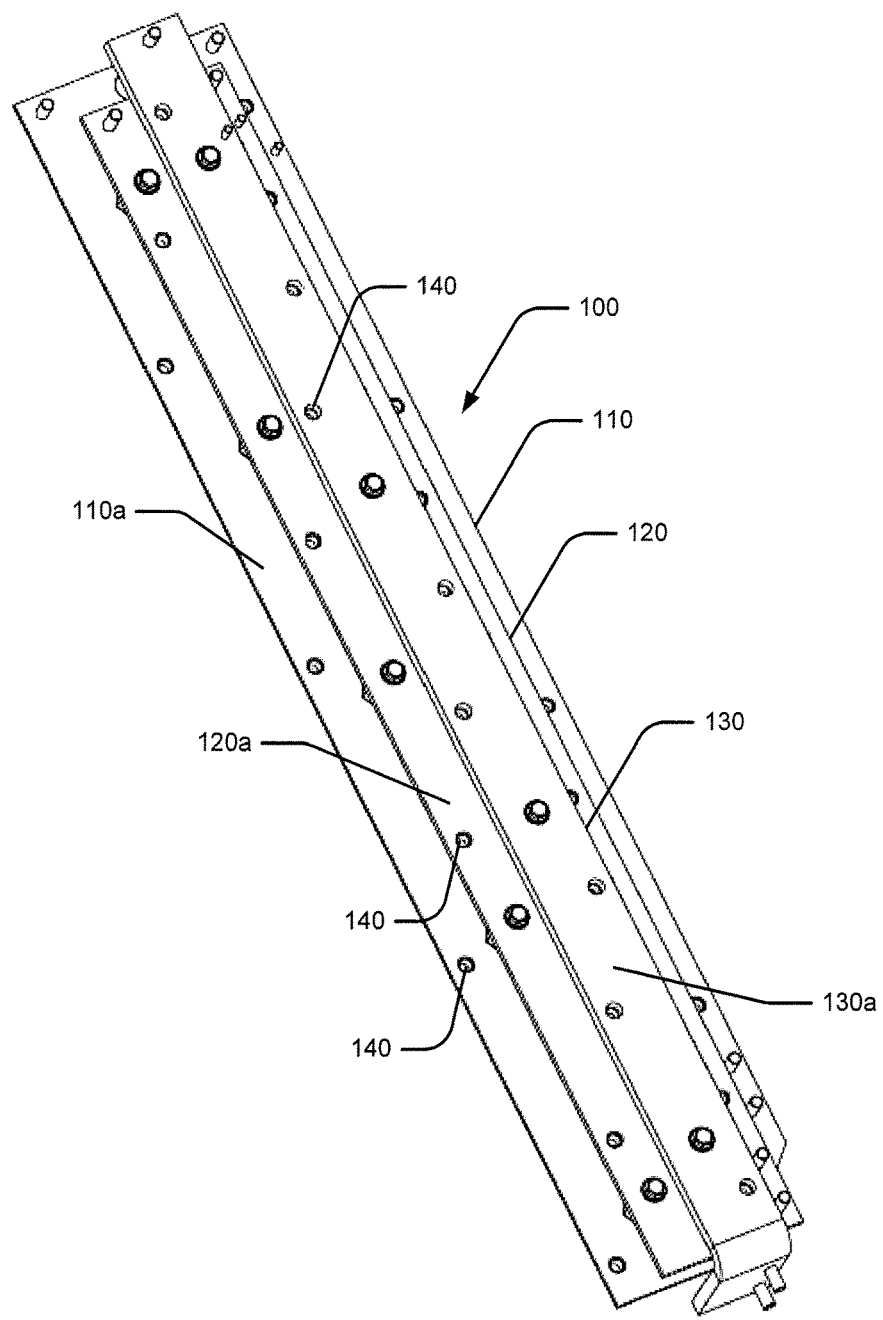
FIG. 1 is perspective view of a bus bar assembly according to some embodiments of the inventive subject matter.
Figure 2:
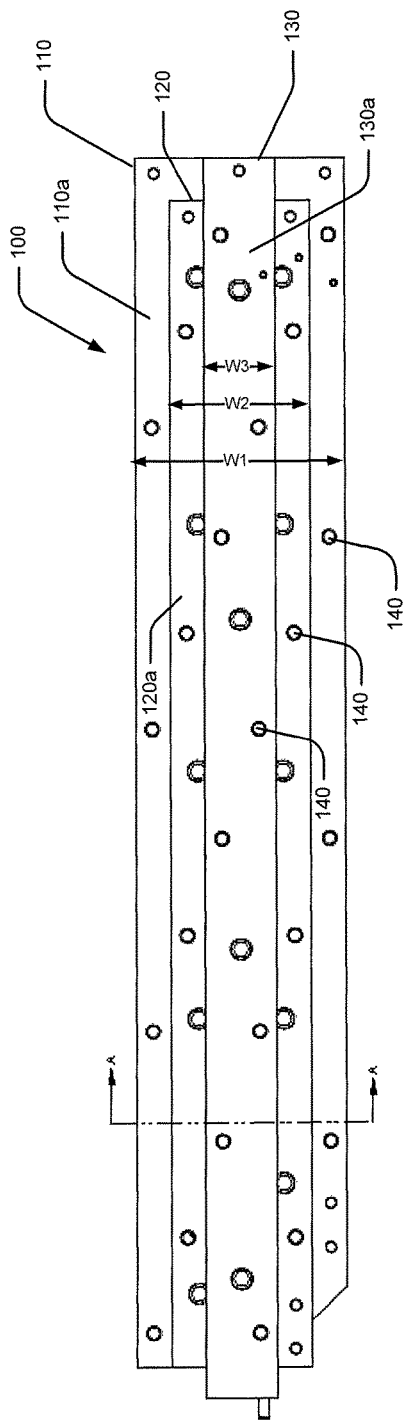
FIG. 2 is a top view of the bus bar assembly of FIG. 1.
Figure 3:
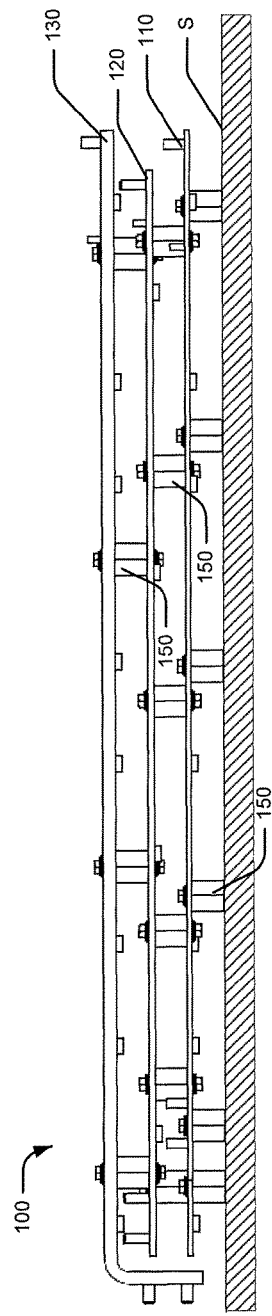
FIG. 3 is a side view of the bus bar assembly of FIG. 1.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Embodiments herein relate to bus bar assemblies that have a compact stacked form factor that may be advantageously used in any of a variety of different types of electrical equipment. According to some embodiments, a multi-phase (e.g., three phase) bus bar assembly includes a plurality of bus bars stacked with their longitudinal axes in substantial alignment and electrically insulated from one another. The bus bars have respective widths that decrease along a direction perpendicular to a surface (e.g., a rear wall) upon the bus bar assembly is mounted, such that each bus bar is narrower than the immediately underlying bus bar. In this manner, conductor attachment surfaces of the bus bars may be more easily accessed. Circuit breakers or other devices may be connected to these conductor attachment surfaces using, for example, wires, conductive bars or other conductors that may be bolted or otherwise attached to the conductor attachment surfaces. The bus bars may have different thicknesses such that cross-sectional areas of the bus bars may be substantially the same and thus provide substantially similar current capacities.

FIGS. 1-4 illustrate a bus bar assembly 100 according to some embodiments of the inventive subject matter. The bus bar assembly 100 includes stacked first, second and third bus bars 110, 120, 130, which may be formed, for example, of a conductive material, such as copper, aluminum or other conductive metals or alloys. The bus bars 110, 120, 130 are mechanically interconnected and electrically insulated from one another by using insulating standoffs 150 that provide spacing between the first and second bus bars 110, 120 and between the second and third bus bars 120, 130. Similar insulating standoffs 150 may be used to mount the first bus bar 110 to a surface S, such as a wall or other surface of an enclosure.

Figure 4:
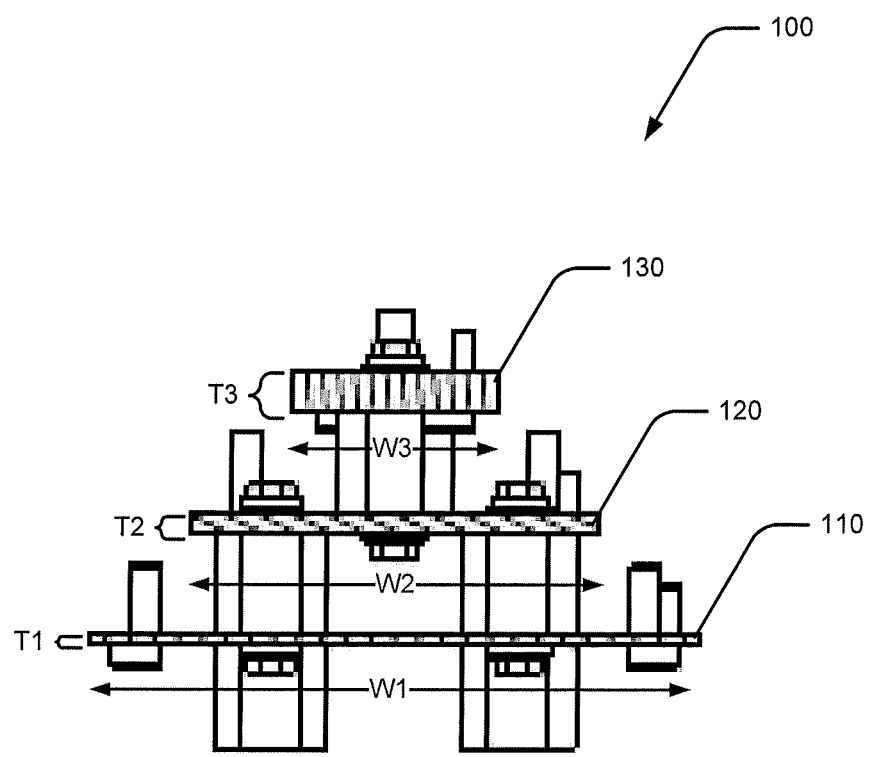
FIG. 4 is a longitudinal cross-section view of the bus bar assembly of FIG. 1.

The bus bars 110, 120, 130 have respective widths W1, W2, W3 that decrease along a direction D perpendicular to the surface S to which the bus bar assembly 100 is mounted, such that the bus bar assembly 100 provides a stepped profile in longitudinal cross section, as shown in FIG. 4. This arrangement exposes surfaces of conductor attachment portions 110a, 120a, 130a proximate respective edges of the bus bars 110, 120, 130. Conductors (e.g., wires, conductive bars, etc.) can be connected to these conductor attachment portions 110a, 120a, 130a using, for example, bolt holes 140 that are configured to receive bolts that may be used to secure conductor terminals to the conductor attachment portions 110a, 120a, 130a. It will be appreciated that other means may be used to attach conductors to the bus bars 110, 120, 130, such as studs that protrude from the conductor attachment portions 110a, 120a, 130a to enable fixation of terminal ends of wires or other conductors to the bus bars 110, 120, 130 using nuts, or clamps, stabs or similar terminations connected to ends of wires or other conductors may be used to engage the edges of the bus bars 110, 120, 130 to provide electrical coupling to the conductor attachment portions 110a, 120a, 130a.

In the illustrated embodiments as further shown in FIG. 4, the first, second and third bus bars 110, 120, 130 are flat bars with rectangular cross-sections. In the illustrated embodiments, the bus bars 110, 120, 130 have respective different thicknesses T1, T2, T3, wherein the first bus bar 110 is thinner than the second bus bar 120 and the second bus bar 120 is thinner than the third bus bar 130, such that cross-sectional areas of the bus bars 110, 120, 130 are substantially equal and thus have substantially equal current-carrying capability. However, it will be appreciated that some embodiments may use bus bars with the same cross-sectional area, wherein this cross-sectional area is great enough to support currents that any of the bars is expected to experience. It will be further appreciated that some embodiments may use bus bars that have non-rectangular cross-sections.

Figure 5:
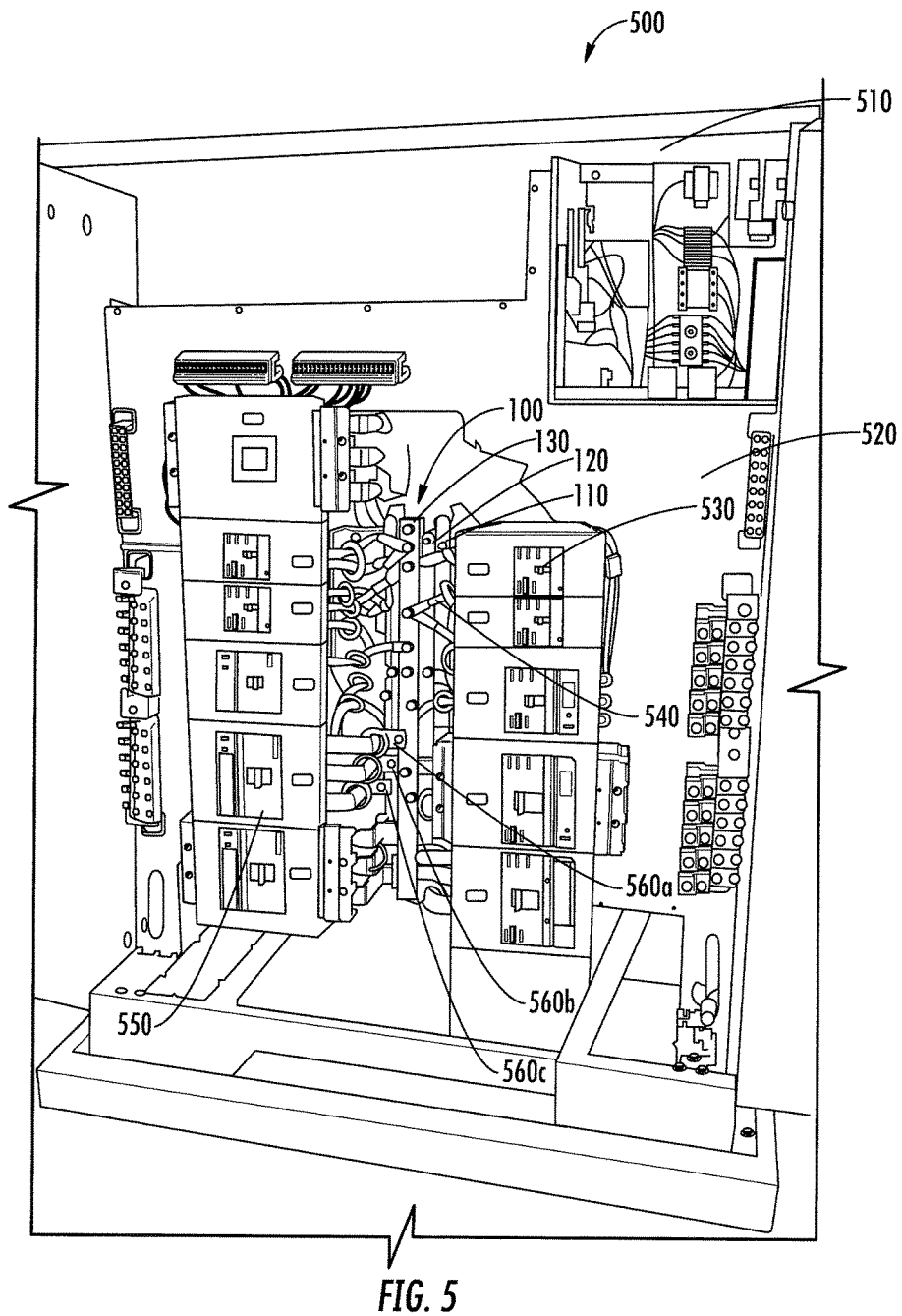
FIG. 5 is a perspective view of a power distribution unit including the bus bar assembly of FIG. 1.
Figure 6:
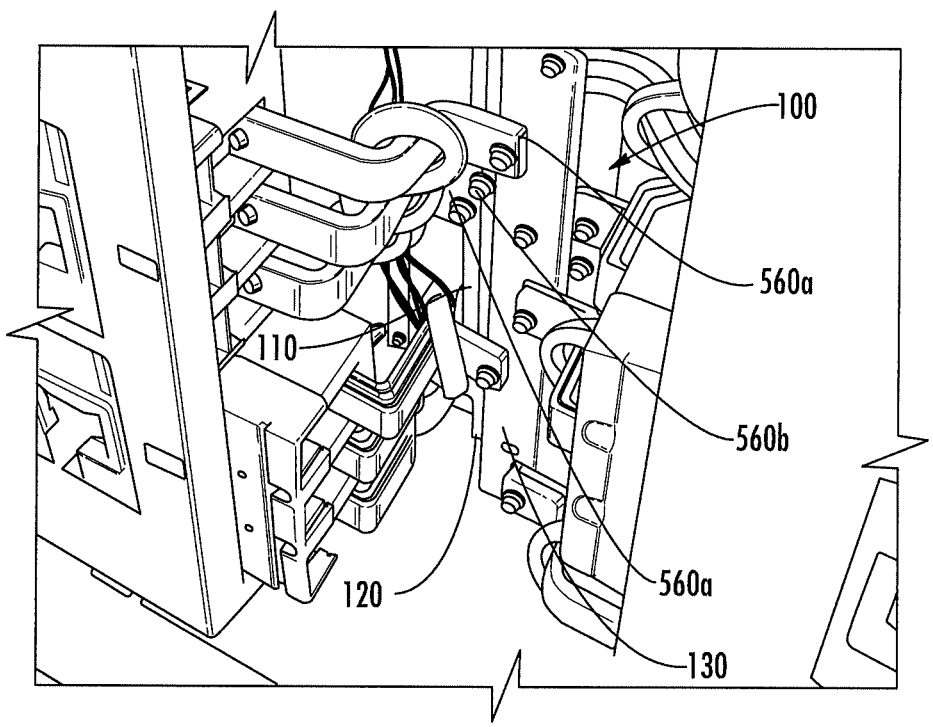
FIG. 6 is detailed view of the power distribution unit of FIG. 5.

According to some embodiments, a bus bar assembly along the lines of the bus bar assembly 100 of FIGS. 1-4 may be used in a PDU to enable connection of circuit breakers or other devices to a three-phase power source. Referring to FIGS. 5 and 6, a three-phase PDU 500 includes an enclosure 510. A surface 520 within the enclosure 510 has a bus bar assembly 100 mounted thereon. Three-phase first circuit breakers 530 have phase line inputs coupled to respective bus bars of the bus bar assembly 100 using wires 540 having first terminals bolted to the bus bars 110, 120, 130 of the bus bar assembly 100 and second terminals bolted to the phase inputs of the first circuit breakers 530. It will be appreciated that connections other than bolted connections may be used, e.g., the wires 540 may be clamped at the phase inputs of the first circuit breakers 530 and/or at the bus bars 110, 120, 130. Three-phase second circuit breakers 550 have phases coupled to respective ones of the bus bars 110, 120, 130 using rigid connecting bar links 560a, 560b, 560c that bolt to the bus bar assembly 100 and the second circuit breakers 550. As can be seen in FIG. 6, the connecting link bars 560a, 560b, 560c may have different lengths and bend locations to accommodate the stepped positioning of the bus bars 110, 120, 130. Such connecting link bars 560a, 560b, 560 may be interchangeable to allow user selectable phase interconnections. Connection arrangements such as those shown in FIGS. 5 and 6 may also be used for devices that are only connected to one or two phases.

It will be appreciated that, in some embodiments, similar bus bar arrangements may include more or fewer bus bars. For example, a similar arrangement of two stacked bus bars may be used for applications in which only two phases are needed (e.g., in residential panels). In other embodiments, one or additional stacked bus bars may be added to provide neutral and/or grounding conductors. Some arrangements may use multiple bus bars per phase, e.g., a stacked bus bar assembly may include two bus bars for each phase, arranged in a stepped manner.

Bus bar assemblies according to embodiments of the inventive subject matter may be advantageously used in PDUs and breaker panels as shown, for example, in FIGS. 5 and 6, but it will be appreciated that bus bar assemblies according to some embodiments may be used in other types of electrical equipment. For example, bus bar assemblies according to some embodiments may also be used in motor drives, motor control centers, uninterruptible power supplies, and the like.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A bus bar assembly, the bus bar assembly comprising:
 a stack of bus bars configured to be attached to a surface and insulated from one another, wherein the bus bars have aligned longitudinal centerlines and respective different widths in a direction perpendicular to the longitudinal centerlines and parallel to the surface that decrease along a direction perpendicular to the surface, wherein the stack of bus bars comprises:
 a first bus bar having a first width;
 a second bus bar overlying the first bus bar and having a second width less than the first width; and
 a third bus bar overlying the second bus bar and having a third width less than the second width.

2. The bus bar assembly of claim 1, wherein the bus bars form a stepped profile in a cross-section plane perpendicular to the longitudinal centerlines.

3. The bus bar assembly of claim 1, wherein the bus bars of the stack of bus bars have substantially the same cross-sectional area.

4. The bus bar assembly of claim 1, wherein the first, second and third bus bars have conductor attachment portions proximate edges thereof.

5. The bus bar assembly of claim 4, wherein the first, second and third bus bars have conductor connection means provided at the conductor attachment portions.

6. The bus bar assembly of claim 5, wherein the conductor connection means comprise bolt holes.

7. The bus bar assembly of claim 1, wherein the second bus bar is thicker than the first bus bar and wherein the third bus bar is thicker than the second bus bar.

8. The bus bar assembly of claim 1, wherein the bus bars are separated from one another by spaced apart insulating standoffs.

9. An apparatus comprising:
an enclosure; and
a stack of flat bus bars attached to a surface in the enclosure and electrically insulated from one another, wherein the bus bars have aligned longitudinal centerlines and respective different widths in a direction perpendicular to the longitudinal centerlines and parallel to the surface that decrease along a direction perpendicular to the surface, wherein the bus bars have substantially the same cross-sectional area and different thicknesses, and wherein the bus bars are further configured to be electrically connected to one or more electrical devices disposed in the enclosure via conductor members attached to conductor attachment portions proximate edges of the bus bars.

10. The apparatus of claim 9, wherein the bus bars form a stepped profile in a cross-section plane perpendicular to the longitudinal centerlines.

11. The apparatus of claim 9, wherein the bus bars have substantially the same cross-sectional area.

12. The apparatus of claim 9, wherein the stack of bus bars comprises:
a first bus bar having a first width;
a second bus bar overlying the first bus bar and having a second width less than the first width; and
a third bus bar overlying the second bus bar and having a third width less than the second width.

13. The apparatus of claim 12, wherein the first, second and third bus bars have conductor connection means provided at the conductor attachment portions thereof.

14. The apparatus of claim 13, wherein the conductor connection means comprise bolt holes.

15. The apparatus of claim 12, wherein the second bus bar is thicker than the first bus bar and wherein the third bus bar is thicker than the second bus bar.

16. A power distribution unit comprising:
an enclosure;
a stack of bus bars mounted on a surface within the enclosure and separated from one another by spaced apart insulating standoff members, wherein the bus bars have aligned longitudinal centerlines and respective widths in a direction perpendicular to the longitudinal centerlines and parallel to the surface that decrease along a direction perpendicular to the surface; and
at least one circuit breaker mounted in the enclosure and electrically connected to the bus bars by conductor members that are attached to conductor attachment portions of the bus bars proximate edges of the bus bars, wherein the stack of bus bars comprises:
a first bus bar having a first width;
a second bus bar overlying the first bus bar and having a second width less than the first width; and
a third bus bar overlying the second bus bar and having a third width less than the second width.

17. The power distribution unit of claim 16, wherein the bus bars form a stepped profile in cross-section plane perpendicular to the longitudinal centerlines.

18. The power distribution unit of claim 16, wherein the bus bars have substantially the same cross-sectional area.

* * * * *